March 25, 1958  F. H. TOWLER ET AL  2,827,924
CONTROL VALVES
Filed March 12, 1953
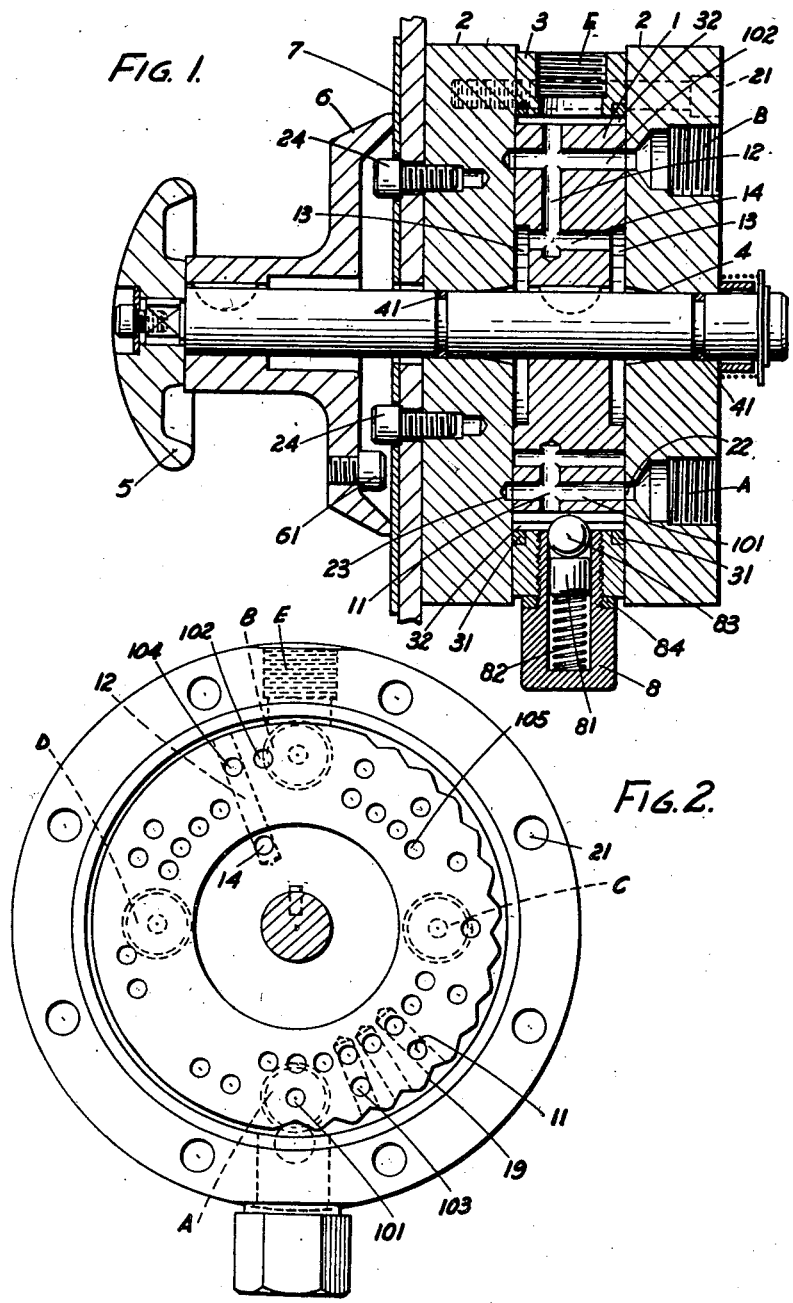
INVENTORS
FRANK HATHORN TOWLER
JOHN MAURICE TOWLER
BY
Carlson, Pitzner, Hubbard & Wolfe
ATTORNEYS United States Patent Office 2,827,924
Patented Mar. 25, 1958

2,827,924

CONTROL VALVES

Frank Hathorn Towler, Rodley, and John Maurice Towler, Dob Park, near Otley, England, assignors to Electraulic Presses Limited, Rodley, near Leeds, England, a British company Application March 12, 1953, Serial No. 342,006

Claims priority, application Great Britain March 15, 1952

9 Claims. (Cl. 137—625.11)

This invention relates to hydraulic systems which have a plural number of servo operated valves for example bypass valves which control the operations of pieces of hydraulic apparatus, for example, pumps, and to the control valves to be used in such systems for distributing the servo pressure to said servo operated valves.

One object of this invention is to provide a control valve of simple construction capable of controlling the supply of servo pressure to a number of servo-operated bypass valves in such manner that the said valves are operated in a predetermined sequence. A further object of this invention is to provide a control valve of simple construction and so designed that, in association with a number of servo-operated bypass unloading valves connected to a series of hydraulic pumps, the said pumps may be loaded and unloaded in a predetermined sequence. Yet a further object of this invention is to provide a control valve of simple construction for association with a number of servo-operated bypass unloading valves, each serving to load and unload a given pump, and the pumps having capacities in geometric progression: 1, 2, 4, 8, etc., the said control valve being designed to load and unload the respective pumps in a predetermined sequence such as to vary the total combined capacity of the pumps in series of steps in arithmetic progression: 1, 2, 3, 4, 5, etc., whereby, for instance, four pumps of relative capacities 1, 2, 4, 8, could be made to give a combined capacity increasing in steps 1, 2, 3, 4, 5 up to 15 when all the pumps would be loaded.

The present invention consists of a hydraulic system which comprises a plural number of servo operated valves which control the operations of pieces of hydraulic apparatus, a supply of servo pressure, and a pilot pressure control valve adapted to distribute the servo pressure to the servo operated valves in a predetermined sequence whereby said servo operated valves will function to cause the pieces of hydraulic apparatus under their control to operate in a corresponding sequence.

In a preferred application the hydraulic system includes servo operated bypass valves and these effect the loading and unloading of the pumps in a series of pumps under the control of a pilot pressure control valve whereby said pumps will be loaded and unloaded in a predetermined sequence, such, for example, as will vary the total combined capacity of the pumps in a series of steps in arithmetic progression.

The present invention also consists of a control valve for distributing servo pressure to several servo operated bypass or other valves in a hydraulic system, said control valve having a valve member which is movable in relation to several outlets and which is provided with a plural number of ports and passages adapted to be supplied with servo pressure, the number and arrangement of the ports and passages being predetermined so that in each complete operation of the valve member the outlets are opened to the servo pressure in a predetermined sequence.

In a preferred application the control valve comprises a stationary valve casing and within it a valve member in the form of a disc which is movable in a circular path said stationary valve casing having a plural number of outlets for servo pressure and a space adapted to be supplied continuously with servo pressure through an inlet and means in the movable valve member for connecting said servo pressure filled space to said outlets in predetermined sequence, said means comprising passages drilled in the valve member which are open at one end to the servo pressure within the said space and at their opposite ends form a series of normally closed outlet openings in one or more concentric rows so disposed in one or both faces of the valve member that each such outlet opening will be opened by being brought into registration with an outlet in the stationary valve casing thereby to deliver servo pressure to the several servo operated valves in a predetermined sequence during each circular and uni-directional motion of the valve member.

In order that the invention may be fully understood and carried into effect a valve according to the above embodiment will now be described, by way of example, by aid of the accompanying drawings in which:

Fig. 1 is a longitudinal section through a complete valve and

Fig. 2 is an end view of the valve disc when exposed by the removal of one side plate of the casing.

The grouping and number of transfer passages in the valve disc shown in the drawings is according to one selected arrangement and may be varied to suit each different order of distribution and for the sake of clearness only a few of the radial passages are shown.

One embodiment of this invention, as illustrated by drawings Figs. 1 and 2, Sheet 1 herewith, comprises a control valve of the rotary type consisting of a valve member, hereafter referred to as a rotor 1 enclosed in a valve body built up of three parts, comprising a cylindrical portion 3 sandwiched between two circular flanges 2 and provided with suitable sealing rings 31 and held together by screws 21. The rotor is keyed to a spindle 4 which in turn is keyed to a knob 5 and rotary dial 6, the position of the dial being indicated by an arrow on the stationary plate 7 the spindle is provided with suitable sealing rings 41 to prevent leakage. The rotor is provided with a number of axial bores passing right through from face to face; there are two rows of axial bores arranged in an inner and outer circle around the spindle, and they are all interconnected by radial bores 11 a few only of which are shown which open into the clearance 32 around the rotor. The said clearance 32 is connected by a radial bore 12 and axial bore 14 with two recesses 13 on either side of the rotor. Servo pressure is delivered to connection E in the cylindrical portion 3 and passes via the clearance 32 and the above mentioned radial and axial bores to the central recesses 13, and consequently the servo pressure has access to every one of the axial bores in the inner and outer rows. Connections A, B, C, and D in the control valve body are each connected to a servo operated bypass-unloading valve (not shown). Connections A and B have inner bores 22 which register with the outer row of axial bores in the rotor; and connections C and D also have similar inner bores not shown which register with the inner row of axial bores in the rotor.

The four inner bores 22 of connections A, B, C and D in one flange 2 have four corresponding blank ended bores 23 in the opposing flange 2, the said bores 22 and 23 being of substantially the same diameter as the axial bores in the rotor, and the recesses 13 on either side of the rotor are of the same diameter, the whole object being to maintain the rotor substantially in axial balance in all positions. The servo operated bypass-unloading valves connected to A, B, C and D respectively are arranged to unload associated pumps having capacities in geometric progression 1, 2, 4, and 8. The said servo operated bypass-unloading valves are of the type in which the bypass valve is closed by servo-pressure, thereby loading the associated pump, and automatically opened to unload the pump when the supply of servo pressure is interrupted.

In Fig. 2 the rotor is shown in the position in which servo pressure is directed via axial bore 101 to connection A thereby loading the pump having a capacity 1, but the other pumps connected to B, C, and D, are unloaded because the servo-pressure is interrupted by the blank face of the rotor. The rotor is capable of being rotated in a clockwise direction, thereby loading and unloading the pumps in sequence, and the rotor is held in each sequential position by a spring detent 83 engaging notches 19 on the circumference of the rotor. The spring detent comprises a casing 8 with spring plunger 81 and spring 82 which holds the detent 83 in contact with the rotor; and a suitable sealing ring 84 is provided to prevent leakage. If the rotor is moved in a clockwise direction to the next notch, then the axial bore 101 will be moved out of registration with connection A and axial bore 102 will come into registration with connection B; consequently the pump with capacity 1 connected to A will be unloaded and the pump with capacity 2 connected to B will be loaded. Then, if the rotor is moved clockwise a further notch, axial bore 103 will come into register with connection A and axial bore 104 will come into register with connection B, thereby loading both pumps to give a capacity of 3. Furthermore, if the rotor is moved a further notch in a clockwise direction, the axial bores 103 and 104 will be moved out of registration with connections A and B, and axial bore 105 will be brought into registration with connection C, thereby loading the pump of capacity 4 and unloading the pumps of capacities 1 and 2.

Thus it will be seen that with a rotary control valve, such as described above and illustrated by the drawing Figs. 1 and 2, in association with suitable servo operated bypass-unloading valves, four pumps having capacities 1, 2, 4 and 8 gallons per minute respectively, may be loaded and unloaded in sequence so that their combined capacities may be varied in equal steps to give 1, 2, 3, 4, 5, 6, 7, 8, 9, 10, 11, 12, 13, 14 and 15 gallons per minute. Also, by moving the rotor anti-clockwise, the combined capacity may be likewise reduced in equal steps. A stop 61 on the dial is provided to engage stops 24 in order to limit the movement of the rotor in either direction.

It will be understood that the spacing of the axial bores in the rotor must be so arranged in relation to the rate of movement of the servo operated bypass-unloading valves that there is a slight interval in which all pumps are unloaded before the next pumps in sequence are loaded.

The above embodiment is by way of illustration and it is not intended to restrict this invention to the loading and unloading of pumps having capacities in geometric relation 1, 2, 4, 8, etc. The invention may be applied with equal facility to effect the loading and unloading of a number of pumps of equal or unequal capacity, and it will be understood that one, two or more circular rows of axial bores or ports may be provided in the valve member or rotor if required. Furthermore, the axial balance of the rotor may be improved by providing outlet connections to the bypass valves on both sides of the rotor instead of on one side as described above.

Should it be necessary in a predetermined sequence that one of the outlets in the valve casing shall be maintained open to the supply of servo pressure whilst the other outlet or outlets is or are intermittently opened and closed the valve member or rotor may be suitably modified for the purpose.

What is claimed is:

1. In a control valve having a casing defining a cylindrical chamber with a plurality of outlet ports in one end wall and an inlet port in its peripheral wall, said outlet ports being arranged in two groups concentric with said chamber, a cylindrical valve member supported for rotation coaxially within said chamber, said member having its ends in sealing engagement with the ends of the chamber and being of smaller diameter than the chamber so as to define therewith an annular space in communication with said inlet port, means operative as the member is rotated for establishing communication between said annular space and said outlet ports in predetermined sequence, said means comprising radially disposed passages drilled in the member and communicating at one end with said annular space, and axially disposed passages drilled in said member and intersecting said radial passages, said axially disposed passages opening through the ends of the member in two concentric rows spaced apart similarly to said groups of outlets to register with said outlets so as to establish communication between the space and the outlets individually and in different combinations as the member is rotated step-by-step through a plurality of positions.

2. In a control valve having a casing defining a cylindrical chamber with a plurality of outlet ports in one end wall and an inlet port in its side wall, a cylindrical valve member supported for rotation coaxially within said chamber, said member having its ends in sealing engagement with the ends of the chamber and being of smaller diameter than the chamber so as to define therewith an annular space in communication with said inlet port, means operative as the member is rotated for establishing communication between said annular space and said outlet ports in predetermined sequence, said means comprising radially disposed passages drilled in the member and communicating at one end with said annular space, and axially disposed passages drilled in said member and intersecting said radial passages, said axially disposed passages and said outlet ports being spaced apart relative to each other and to the axis of said cylinder so as to connect said inlet port with said outlet ports individually and in different combinations of two, three and four of the ports as the member is rotated through successive positions.

3. A control valve comprising, in combination, an annular member sandwiched between two flat-faced end members and defining a cylindrical chamber, a disc-shaped rotor disposed in said chamber, said rotor being dimensioned to afford a sealing fit against the end faces of said chamber and to leave a clearance space between its peripheral edge and the adjacent peripheral wall of the chamber, a pressure fluid inlet opening through said annular member into said clearance space, a plurality of pressure fluid outlets arranged concentrically of the axis of said rotor and opening through one of said end members, a series of axial bores in said rotor arranged concentrically of said rotor and adapted to register with said outlets in selected positions of the rotor, radial passages in said rotor connecting said bores with said clearance space, said bores and said outlets being relatively spaced circumferentially of the rotor axis to provide for connection of the inlet port with said outlet ports individually and in all combinations as the rotor is turned through successive steps.

4. A control valve as defined in claim 3 in which the opposite faces of the rotor are formed with centrally disposed circular recesses of substantial area connected by radially and axially disposed passages with the clearance space around the rotor to receive pressure fluid for maintaining the rotor in axial balance.

5. A control valve as defined in claim 3 in which the axial bores open in opposite faces of the rotor so that the fluid in the bores exerts equal pressure on each end of the chamber when the bores are out of registration with the outlets.

6. A control valve as defined in claim 5 in which one of the end members is formed with closed end bores of the same diameter as the axial bores in the rotor and alined with the outlet openings in the other end member.

7. A control valve as defined in claim 3 in which the peripheral edge of the rotor is formed with indentations engageable by a spring-biased detent to retain the rotor in selected positions of adjustment.

8. A control valve as defined in claim 7 in which the axial bores in the rotor are arranged in two annular rows with the outlets respectively positioned for registration with the bores of the two rows.

9. A control valve as defined in claim 8 in which two outlets are provided for registration with each row of bores and in which the bores are arranged in combinations such that the outlets are connected to receive pressure fluid individually and in different combinations as the rotor is moved through its various positions.

References Cited in the file of this patent
UNITED STATES PATENTS

| | | |
|---|---|---|
| 708,785 | Staaf | Sept. 9, 1902 |
| 885,145 | Davis | Apr. 21, 1908 |
| 2,335,085 | Roberts | Nov. 23, 1943 |
| 2,384,318 | Le Bleu | Sept. 4, 1945 |
| 2,510,514 | Mueller | June 6, 1950 |
| 2,524,234 | Schenk | Oct. 3, 1950 |
| 2,742,050 | Gray | Apr. 17, 1956 |